(12) United States Patent
Rahal-Arabi et al.

(10) Patent No.: US 10,613,618 B2
(45) Date of Patent: Apr. 7, 2020

(54) PROGRAMMABLE IMON ACCURACY IN POWER SYSTEMS

(71) Applicant: Intel Corporation, Santa Clara, CA (US)

(72) Inventors: Tawfik Rahal-Arabi, Tigard, OR (US); Mo S. Bashir, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 15/717,702

(22) Filed: Sep. 27, 2017

(65) Prior Publication Data

US 2019/0094948 A1 Mar. 28, 2019

(51) Int. Cl.
*G06F 15/177* (2006.01)
*G06F 9/00* (2006.01)
*G06F 1/3296* (2019.01)
*G06F 1/324* (2019.01)
*G06F 9/4401* (2018.01)

(52) U.S. Cl.
CPC ............ *G06F 1/3296* (2013.01); *G06F 1/324* (2013.01); *G06F 9/4401* (2013.01); *G06F 9/4405* (2013.01)

(58) Field of Classification Search
CPC .... G06F 1/3296; G06F 9/4405; G06F 9/4401; G06F 1/324
See application file for complete search history.

(56) References Cited

U.S. PATENT DOCUMENTS

| 2002/0079874 | A1 | 6/2002 | Horigan et al. |
| 2009/0077402 | A1 | 3/2009 | Huang et al. |
| 2010/0187906 | A1 | 7/2010 | Berke et al. |
| 2017/0255251 | A1 | 9/2017 | Zhang et al. |

FOREIGN PATENT DOCUMENTS

JP 2008140062 A 6/2008

OTHER PUBLICATIONS

PCT International Search Report and Written Opinion in PCT/US2018/049160 dated Dec. 26, 2018, 14 pages.

*Primary Examiner* — Xuxing Chen
(74) *Attorney, Agent, or Firm* — Patent Capital Group

(57) ABSTRACT

To compensate for inaccuracies in reported values for current output from a voltage regulator (VR) to a processor, the VR may be tested, and a load line determined so the processor can calculate the inaccuracy. This load line may be programmed into the BIOS as an offset, and the BIOS values used from then on so the CPU can determine what the true inaccuracy is, as opposed to the inaccuracy requested of the VR manufacturer. These values may be used during operation to control CPU turbo mode and CPU throttling.

22 Claims, 4 Drawing Sheets

| IMON inaccuracy | OEM IMON Cost | Actual Implemented Load Line in mOhms | Programmed Load Line in mOhms | Performance Expectation for a Given Workload |
| --- | --- | --- | --- | --- |
| 2% | 100% | 1.5 | 1.5 | 100% |
| 5% | 80% | 1.5 | 2 | 98% |
| 7% | 70% | 1.5 | 2.5 | 95% |
| 10% | 50% | 1.5 | 3 | 93% |
| 15% | 40% | 1.5 | 3.5 | 92% |
| 20% | 25% | 1.5 | 4 | 90% |

FIG. 2

PROGRAMMABLE IMON ACCURACY IN POWER SYSTEMS

TECHNICAL FIELD OF THE INVENTION

Various embodiments of the invention relate to control of power supplies for computer systems. In particular, signals from the voltage regulator to the processor enable the processor to calculate the voltage it should receive on each rail.

BACKGROUND

For the purposes of this document, IMON is the name of a signal that represents the level of output current for a voltage output of a voltage regulator. Other documents may use other names to describe the same thing. Typically, there is a separate IMON for each VR output voltage (5 V, 12 V, etc.). Since power is equal to voltage times current, the accuracy of the processor power calculation is directly proportional to the accuracy of the IMON signal. This accuracy may be important. For example, if the processor concludes it is not consuming its power allocation, it may go into Turbo mode and if it determines it is exceeding its power allocation, it may throttle its performance. Therefore, inaccuracies in the IMON signal may cause the processor to either underperform or to exceed its designated performance goals.

VRs from the same manufacturing lot may have different accuracies. Therefore, an OEM may want VRs with an accuracy of +/−5%, but receive VRs with an accuracy of (for example) only +/−20%, the difference reflecting cost savings in the VR. This variance may cause a loss of performance in the associated processor. For example, a more expensive high performance processor may only achieve the performance of a cheaper low performance processor, simply because it mistakenly limits the power it receives from the VR based on an inaccurate IMON reading.

BRIEF DESCRIPTION OF THE DRAWINGS

Some embodiments of the invention may be better understood by referring to the following description and accompanying drawings that are used to illustrate embodiments of the invention. In the drawings:

FIG. 2 shows a table of values representing load lines, according to an embodiment of the invention.

DETAILED DESCRIPTION

Figure 1:
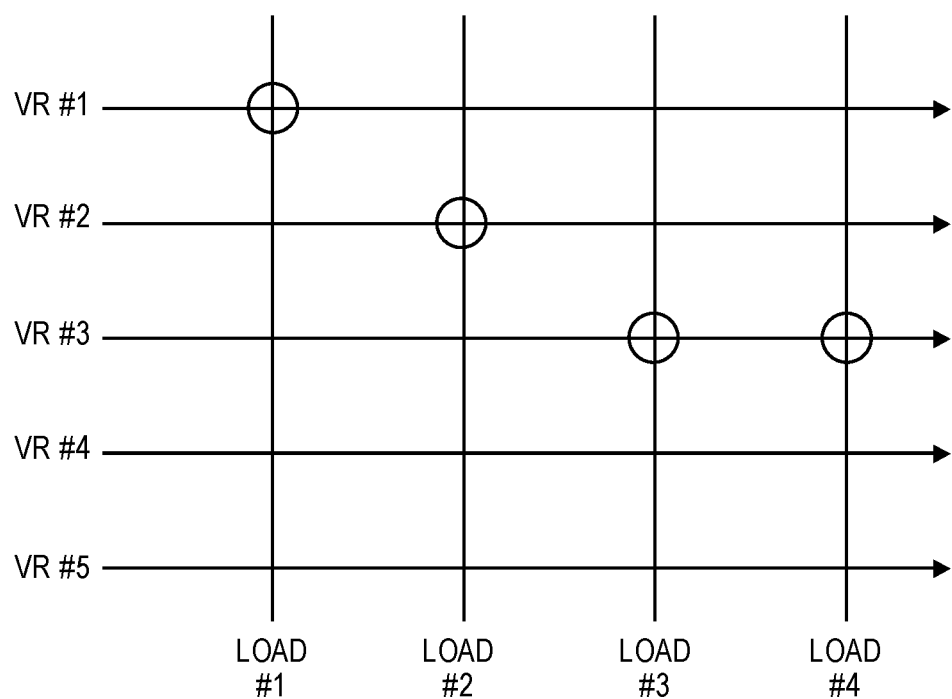
FIG. 1 shows s system of multiple voltage regulators (VRs) delivering power to multiple loads.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented fully or partially in software and/or firmware. This software and/or firmware may take the form of instructions contained in or on a non-transitory computer-readable storage medium. The instructions may be read and executed by one or more processors to enable performance of the operations described herein. The medium may be internal or external to the device containing the processor(s), and may be internal or external to the device performing the operations. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Various embodiments of the invention may convey IMON accuracy to the processor with a programmable load line. For example, it is possible to translate the accuracy of IMON to different values of the load line and program these values accordingly. For example, if the accuracy of IMON is well below the accuracy specified for it, then a steeper load line than actually implemented may be programmed. Accordingly, the processor, thinking it has a steeper load line than actually implemented, may assign a lower frequency/performance for a given power to avoid excessive throttling.

Similarly, if IMON has a higher accuracy than specified, then a shallower load line than was actually implemented may be programmed. Accordingly, the processor, thinking it has a shallower load line than actually implemented, may assign a higher frequency/performance for a given power than would otherwise be used.

FIG. 1 shows s system of multiple voltage regulators (VRs) delivering power to multiple loads. Each VR #1-5 may output a different voltage. Each load #1-4 may represent a different module, circuit, or device that consumes power from one or more of the indicated VRs. The circles indicate which loads are coupled to which VRs in this particular example. For example, VR #1 may deliver its voltage to load #1, VR #2 may delivery its voltage to load #2, VR #3 may deliver its voltage to load #3 and load #4, while VR #4 and VR #5 are not connected to any of the illustrated loads.

There are various ways to convey the accuracy of the current (the IMON) from a VR to the processor system using that current. Various embodiments of the invention may convey this information through a 'load line'.

FIG. 2 shows a table of values representing load lines, according to an embodiment of the invention. These values are for example only, and do not necessarily represent actual values in a real system. As can be seen in the first column, each line in the table represents a different accuracy, with decreasing accuracy as you move down the table. Similarly, the second column may show the relative cost of each level of accuracy, with decreasing accuracy equating to reduced cost. The 100% figure presents the cost of the most expensive IMON. As can be seen in the third column, the actual implemented load line is consistent through all these examples, at 1.5 milliohms (mOhms).

However, the CPU (or other device) may program the load line to a different value, shown in the fourth column, by adding an offset to the actual implemented load line. As shown, the programmed value of the load line may increase with decreasing accuracy of the IMON, resulting in better performance expectations for a given workload, with the amount of improvement going up as IMON inaccuracy goes down. In the case of FIG. 2, the programmed offset for an IMON with an inaccuracy of 20% produces a performance loss of only 10%.

Figure 3:
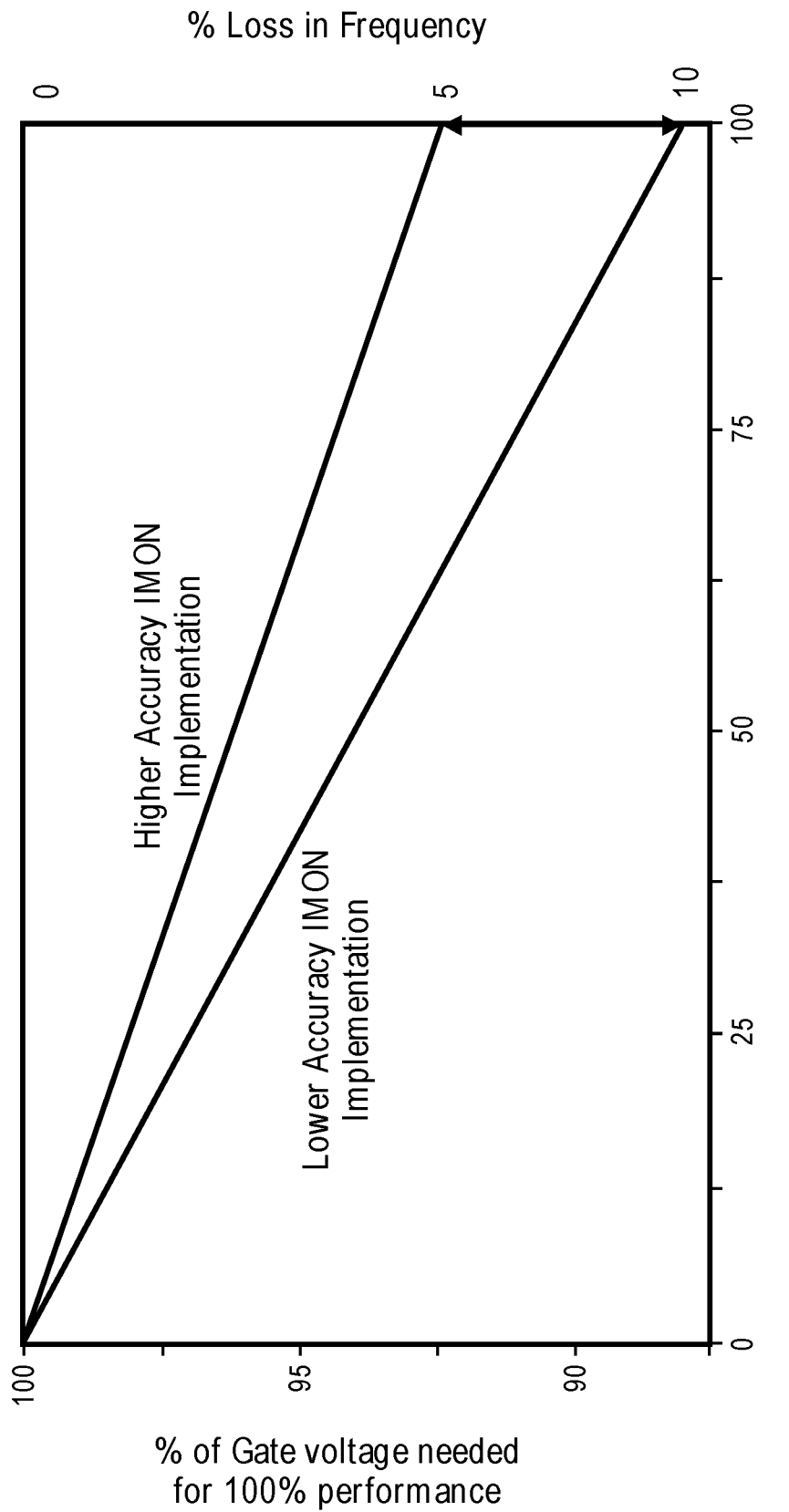
FIG. 3 shows a chart of two load lines, according to some embodiments of the invention.

FIG. 3 shows a chart of two load lines, according to some embodiments of the invention. These are shown as examples to illustrate the concepts, but the values shown should not be taken as representative of any real-world implementation. The upper line with the shallower slope in FIG. 3 may be representative of an IMON with a higher accuracy. The lower line with the steeper slope may be representative of an IMON with a lower accuracy relative to the upper line. In an actual implementation, a single load line may be used to represent the particular load line for a VR, but two are shown in FIG. 3 to illustrate their relationship to each other.

Regarding the graph, the horizontal axis may be interpreted as the percentage of maximum output current produced by the VR, ranging from 0% to 100%. On the right hand vertical axis, a % loss in frequency is indicated. In the example shown, the higher accuracy IMON load line sees a loss in frequency ranging from 0% at no output current, to an approximate 5% loss in frequency at 100% output current. Similarly, the lower accuracy IMON load line sees a loss in frequency ranging from 0% at no output current, to an approximate 10% loss at 100% output current.

The left-hand vertical axis shows the % of gate voltage needed for 100% performance, ranging from 100% gate voltage at 0 output current, to lesser amounts of gate voltage needed for higher output currents. These readings can be mapped to the % loss in frequency by simply drawing a horizontal line across the graph and seeing where the horizontal line intersects the load line, the % of gate voltage, and the % loss in frequency.

Figure 4:
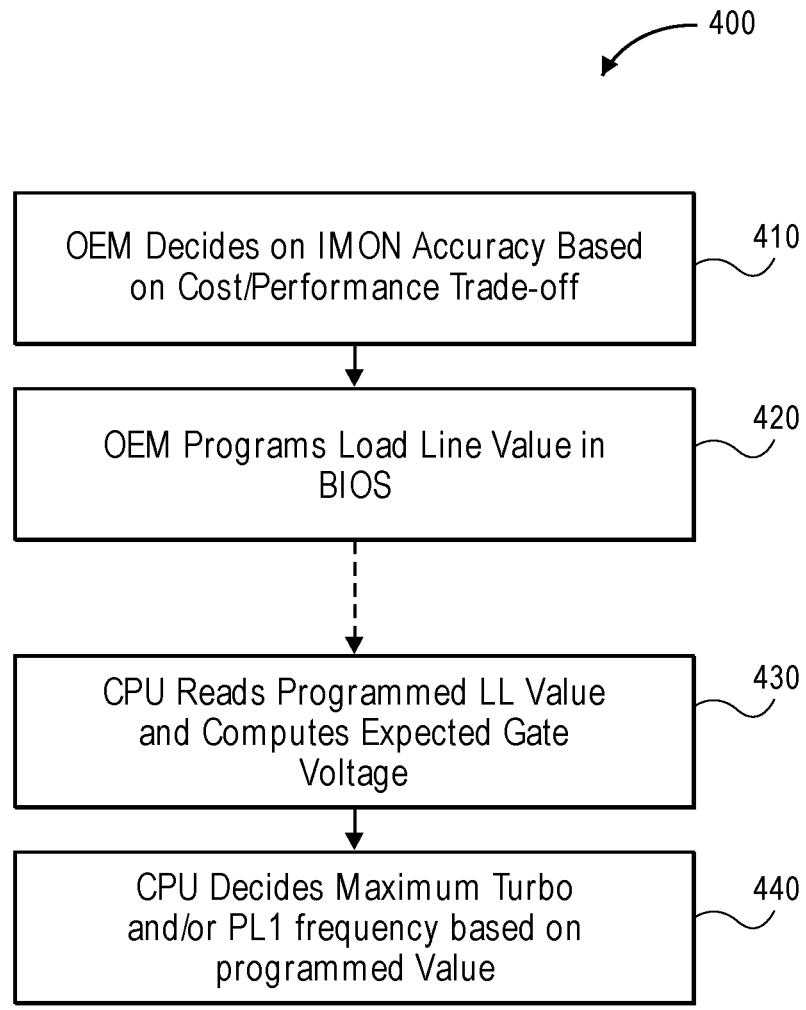
FIG. 4 shows a flow diagram of a method of managing power consumption, according to an embodiment of the invention.

FIG. 4 shows a flow diagram of a method of managing power consumption, according to an embodiment of the invention. In flow diagram 400, at 410 an original equipment manufacturer (OEM) or other entity may decide on a desired IMON accuracy, based on a cost/performance trade off. This trade off may be based, for example, on a table such as that shown in FIG. 2, or a chart such as that shown in FIG. 3. Based on this accuracy and the associated table or chart, at 420 the OEM may program the values of a load line into a BIOS. In some embodiments, the BIOS and the associated VR may be contained on the same die. Each wafer may produce multiple dies, each with its own separate VR and BIOS, with the accuracy of the VR and IMON signal being different for each die.

After the actions of 410 and 420 the CPU may, in some embodiments, be in a non-operational state for a while, such as when it is being boxed up, shipped, and sold. But when the CPU goes into operation, it may read the programmed load line value at 430 and compute an expected gate voltage based on that programmed load line. At 440 the CPU may decide on maximum turbo settings and/or PL1 frequency based on the programmed value. For the purposes of this document, PL1 refers to the maximum CPU power that the system cooling solution can maintain indefinitely without interruption

EXAMPLES

The following examples pertain to particular embodiments:

Example 1 includes a device for controlling power, the device comprising a CPU and a memory, wherein the CPU is configured to: read a programmed load line value from a BIOS; compute expected gate voltage using the load line value; and determine maximum turbo mode based on the programmed load line.

Example 2 includes the device of example 1, wherein the programmed load line is to indicate IMON accuracy.

Example 3 includes the device of example 1, wherein the programmed load line is to indicate an offset from an implemented load line.

Example 4 includes a method of power control, comprising: reading a programmed load line value from a BIOS; computing a gate voltage using the load line value; and determining maximum turbo mode based on the programmed load line.

Example 5 includes the method of example 4, wherein the programmed load line indicates IMON accuracy.

Example 6 includes the method of example 4, wherein the programmed load line indicates an offset from an implemented load line.

Example 7 includes a computer-readable non-transitory storage medium that contains instructions, which when executed by one or more processors result in performing operations comprising: reading a programmed load line value from a BIOS; computing a gate voltage using the load line value; and determining maximum turbo mode based on the programmed load line.

Example 8 includes the medium of example 7, wherein the programmed load line indicates IMON accuracy.

Example 9 includes the medium of example 7, wherein the programmed load line indicates an offset from an implemented load line.

Example 10 includes a device for controlling power, the device configured for: selecting first and second IMON accuracies based on first and second cost/performance trade-offs; programming a first load line into a first BIOS based on the selected first IMON accuracy; programming a second load line into a second BIOS based on the selected second IMON accuracy;

Example 11 includes the device of example 10, wherein the first BIOS is to be contained on a first die with a first voltage regulator and the second BIOS is to be contained on a second die with a second voltage regulator.

Example 12 includes the device of example 11, wherein the first load line is to indicate a first IMON accuracy and the second load line is to indicate a second IMON accuracy different than the first.

Example 13 includes the device of example 11, wherein the first load line is to indicate an offset from an implemented load line.

Example 14 includes a method of controlling power, comprising: selecting first and second IMON accuracies based on first and second cost/performance trade-offs; programming a first load line into a first BIOS based on the selected first IMON accuracy; and programming a second load line into a second BIOS based on the selected second IMON accuracy;

Example 15 includes the method of example 14, wherein the first load line indicates a first IMON accuracy and the second load line indicates a second IMON accuracy different than the first.

Example 16 includes the method of example 14, wherein the first load line indicates an offset from an implemented load line.

Example 17 includes a computer-readable non-transitory storage medium that contains instructions, which when executed by one or more processors result in performing operations comprising: selecting first and second IMON accuracies based on first and second cost/performance trade-offs; programming a first load line into a first BIOS based on the selected first IMON accuracy; and programming a second load line into a second BIOS based on the selected second IMON accuracy;

Example 18 includes the medium of example 17, wherein the first load line indicates a first IMON accuracy and the second load line indicates a second IMON accuracy different than the first.

Example 19 includes the medium of example 17, wherein the first load line indicates an offset from an implemented load line.

Example 20 includes a device for controlling power, the device comprising means to: read a programmed load line value from a BIOS; compute expected gate voltage using the load line value; and determine maximum turbo mode based on the programmed load line.

Example 21 includes the device of example 20, wherein the programmed load line includes means to indicate IMON accuracy.

Example 22 includes the device of example 20, wherein the programmed load line is to includes means to indicate an offset from an implemented load line.

Example 23 includes a device for controlling power, the device including means for: selecting first and second IMON accuracies based on first and second cost/performance trade-offs; programming a first load line into a first BIOS based on the selected first IMON accuracy; and programming a second load line into a second BIOS based on the selected second IMON accuracy;

Example 24 includes the device of example 23, wherein the first BIOS is to be contained on a first die with a first voltage regulator and the second BIOS is to be contained on a second die with a second voltage regulator.

Example 25 includes the device of example 23, wherein the first load line includes means to indicate a first IMON accuracy and the second load line is to indicate a second IMON accuracy different than the first.

Example 26 includes the device of example 23, wherein the first load line is to indicate an offset from an implemented load line.

The foregoing description is intended to be illustrative and not limiting. Variations will occur to those of skill in the art. Those variations are intended to be included in the various embodiments of the invention, which are limited only by the scope of the following claims.

What is claimed is:

1. A device for controlling power, the device comprising: a CPU and a memory, wherein the CPU is configured to: read a programmed load line value from a BIOS; compute an expected gate voltage using the load line value; and
determine a maximum turbo mode based on the programmed load line value;
wherein the programmed load line value is to indicate IMON accuracy.

2. The device of claim 1, wherein the programmed load line value is to indicate an offset from an implemented load line.

3. A method of power control, comprising:
reading a programmed load line value from a BIOS;
computing a gate voltage using the load line value; and
determining a maximum turbo mode based on the programmed load line value;
wherein the programmed load line value indicates IMON accuracy.

4. The method of claim 3, wherein the programmed load line value indicates an offset from an implemented load line.

5. A computer-readable non-transitory storage medium that contains instructions, which when executed by one or more processors result in performing operations comprising:
reading a programmed load line value from a BIOS;
computing a gate voltage using the load line value; and
determining a maximum turbo mode based on the programmed load line value;
wherein the programmed load line value indicates IMON accuracy.

6. The medium of claim 5, wherein the programmed load line value indicates an offset from an implemented load line.

7. A device for controlling power, the device configured for:
selecting first and second IMON accuracies based on first and second cost/performance trade-offs;
programming a first load line value into a first BIOS based on the selected first IMON accuracy; and
programming a second load line value into a second BIOS based on the selected second IMON accuracy.

8. The device of claim 7, wherein the first BIOS is to be contained on a first die with a first voltage regulator and the second BIOS is to be contained on a second die with a second voltage regulator.

9. The device of claim 8, wherein the first load line value is to indicate a first IMON accuracy and the second load line value is to indicate a second IMON accuracy different than the first IMON accuracy.

10. The device of claim 8, wherein the first load line value is to indicate an offset from an implemented load line.

11. A method of controlling power, comprising:
selecting first and second IMON accuracies based on first and second cost/performance trade-offs;
programming a first load line value into a first BIOS based on the selected first IMON accuracy; and
programming a second load line value into a second BIOS based on the selected second IMON accuracy.

12. The method of claim 11, wherein the first load line value indicates a first IMON accuracy and the second load line value indicates a second IMON accuracy different than the first IMON accuracy.

13. The method of claim 11, wherein the first load line value indicates an offset from an implemented load line.

14. A computer-readable non-transitory storage medium that contains instructions, which when executed by one or more processors result in performing operations comprising:

selecting first and second IMON accuracies based on first and second cost/performance trade-offs;
programming a first load line value into a first BIOS based on the selected first IMON accuracy; and
programming a second load line value into a second BIOS based on the selected second IMON accuracy.

15. The medium of claim 14, wherein the first load line value indicates a first IMON accuracy and the second load line value indicates a second IMON accuracy different than the first IMON accuracy.

16. The medium of claim 14, wherein the first load line value indicates an offset from an implemented load line.

17. A device for controlling power, the device comprising a computer-readable medium including instructions; and means to:
   read a programmed load line value from a BIOS;
   compute an expected gate voltage using the load line value; and
   determine a maximum turbo mode based on the programmed load line value;
wherein the programmed load line value includes means to indicate IMON accuracy.

18. The device of claim 17, wherein the programmed load line value includes means to indicate an offset from an implemented load line.

19. A device for controlling power, the device including a computer-readable medium including instructions; and means for:
   selecting first and second IMON accuracies based on first and second cost/performance trade-offs;
   programming a first load line value into a first BIOS based on the selected first IMON accuracy; and
   programming a second load line value into a second BIOS based on the selected second IMON accuracy.

20. The device of claim 19, wherein the first BIOS is to be contained on a first die with a first voltage regulator and the second BIOS is to be contained on a second die with a second voltage regulator.

21. The device of claim 19, wherein the first load line value includes means to indicate a first IMON accuracy and the second load line value is to indicate a second IMON accuracy different than the first IMON accuracy.

22. The device of claim 19, wherein the first load line value is to indicate an offset from an implemented load line.

* * * * *